United States Patent
Iiduka et al.

(10) Patent No.: US 7,145,086 B2
(45) Date of Patent: Dec. 5, 2006

(54) ELECTRONIC BALANCE

(75) Inventors: Atushi Iiduka, Toyonaka (JP); Kunio Shimauchi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 57 days.

(21) Appl. No.: 11/138,051

(22) Filed: May 26, 2005

(65) Prior Publication Data

US 2006/0021803 A1    Feb. 2, 2006

(30) Foreign Application Priority Data

Jul. 30, 2004    (JP)    ............................. 2004-222980

(51) Int. Cl.
*G01G 21/01*    (2006.01)
(52) U.S. Cl. ...................... 177/180; 177/238
(58) Field of Classification Search ........ 177/180–181, 177/238–244
See application file for complete search history.

(56) References Cited

U.S. PATENT DOCUMENTS

| | | | | |
|---|---|---|---|---|
| 4,666,005 A | * | 5/1987 | Komoto et al. | ............. 177/180 |
| 4,700,793 A | * | 10/1987 | Luchinger | .................. 177/181 |
| 4,884,645 A | * | 12/1989 | Knothe et al. | .............. 177/180 |
| 5,152,356 A | * | 10/1992 | Strickler et al. | ............ 177/180 |
| 5,475,933 A | * | 12/1995 | Ueda | .............................. 34/90 |
| 5,613,304 A | * | 3/1997 | Lin | ................................ 34/90 |
| 5,617,648 A | * | 4/1997 | Leisinger et al. | ............. 34/226 |
| 5,865,099 A | * | 2/1999 | Waugh | ........................ 99/340 |
| 6,515,238 B1 | * | 2/2003 | Martens et al. | ............. 177/180 |
| 6,909,058 B1 | * | 6/2005 | Luchinger et al. | .......... 177/180 |
| 6,923,449 B1 | * | 8/2005 | Burkhard et al. | ........... 277/412 |
| 6,945,130 B1 | * | 9/2005 | Burkhard | ................... 73/865.6 |
| 6,951,989 B1 | * | 10/2005 | Nufer et al. | ................ 177/180 |

FOREIGN PATENT DOCUMENTS

JP    6-52190    7/1994

* cited by examiner

*Primary Examiner*—Randy W. Gibson
(74) *Attorney, Agent, or Firm*—Rankin, Hill, Porter & Clark LLP (57) ABSTRACT

A floor portion separates a weighing chamber encircled by a windshield case and accommodating a weighing pan, and a balance body accommodating a load detecting section, an incorporated weight, etc. A plurality of vents is provided through the floor portion. A movable floor is arranged to be able to move back and forth on supporting members. A plurality of vents is provided through the movable floor on the rear side of the floor portion so that number and center position of the vents of the movable floor is the same as the vents of the floor portion. When a temperature difference between the temperatures within the weighing chamber and within the balance body is large, the movable floor is moved to permit airflow between the weighing chamber and the balance body.

8 Claims, 7 Drawing Sheets

ELECTRONIC BALANCE

This application claims foreign priority based on Japanese Patent application No. 2004-222980, filed Jul. 30, 2004, the contents of which is incorporated herein by reference in its entirety.

BACKGROUND OF THE INVENTION

1. Field of the Invention

This invention relates to an electronic balance equipped with a windshield case, and more particularly to an electronic balance having a high-resolution for eliminating a difference in a buoyancy between a weight for calibration incorporated in a balance body and a measuring object placed on a weighing pan within a weighing chamber.

2. Description of the Related Art

In an electronic balance having high accuracy permitting a very fine minimum readout value, high resolution and automatic sensitivity calibrating function, influence of air convection and temperature change due to the wind from outside may cause an error. In such an electronic balance, in order to remove the cause of an error, a method of encircling the periphery of a weighing pan by a windshield case is adopted. This electronic balance equipped with the windshield case, as shown in a schematic configuration diagram of FIG. 8, generally comprises a weighing chamber 93 accommodating a weighing pan 91 and encircled by a windshield case 92. The electronic balance further comprises a balance body 94 incorporating a calibration weight which is a weight for calibration, its adding/removing mechanism, a load detecting section and the like. The weighing chamber 93 and the balance body 94 are separated by a floor 95 of the weighing chamber 93. The weighing pan 91 and the load detecting section are coupled by means of an on-pan load transmitting shaft (not shown).

Then, after a predetermined temperature change or a predetermined time passage, the calibration weight is automatically applied to the load detecting section. On the basis of the output produced at this time and a previously stored mass of weight, the sensitivity coefficient is corrected and updated to a new sensitivity coefficient. (For example, refer to JP-B-6-52190.)

Figure 8:
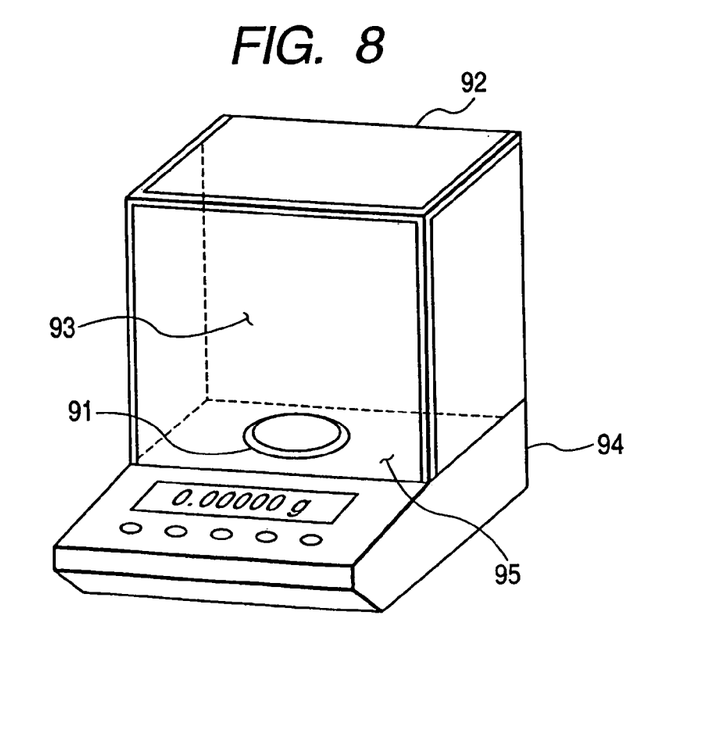
FIG. 8 is an external appearance view of an electronic balance equipped with a windshield case.

The electronic balance of the related art is constructed as described above. Meanwhile, the balance body 94, which is provided with an incorporated component and a case, has a larger heat capacity than the weighing chamber 93. Therefore, when an ambient temperature or the temperature of the balance body 94 drastically changes, temperature difference is likely to occur between the weighing chamber 93 and the balance body 94. For example, when the electronic balance is actuated in a state where the indoor air-conditioning is stopped in which the electronic balance is placed, since the weighing chamber 93 has a smaller heat capacity, its internal temperature can relatively easily catch up with the change of the air-conditioning temperature. On the other hand, since the balance body 94 has a larger heat capacity, the balance body 94 has a poor track-ability for the air-conditioning temperature. Thus, a temperature difference occurs between the weighing chamber 93 and the balance body 94. Specifically, in summer, since the air-conditioning temperature is lower than an outdoor temperature, the temperature in the weighing chamber 93 is likely to be lower than that of the balance body 94. Inversely, in winter, since the air-conditioning temperature is higher than the outdoor temperature, the temperature in the weighing chamber 93 is likely to be higher than that of the balance body 94.

As described above, if the temperatures within the weighing chamber 93 and the balance body 94 are different, the respective air densities within the weighing chamber 93 and balance body 94 are also different. Thus, a difference occurs between the buoyancy which a measuring object placed on the weighing pan 91 receives and that which the calibration weight receives, which results in an error in the measured value.

SUMMARY OF THE INVENTION

This invention has been accomplished in view of such circumstances. An object of this invention is to provide an electronic balance having high accuracy and capable of weighing by eliminating the temperature difference between a weighing chamber and a balance body.

In order to achieve the above object, a first aspect of the invention is an electronic balance provided with a balance body incorporating a load measuring mechanism and a calibration weight, and a weighing chamber encircled by a windshield case arranged above the balance body, the electronic balance comprises a floor portion separating the balance body and the weighing chamber, and provided with at least one vent, a movable floor arranged parallel in the vicinity of the floor portion, and provided with at least one vent corresponding to the vent of the floor portion, and a moving mechanism for moving the movable floor in parallel to the floor portion.

According to the first aspect of the invention, the electronic balance further comprises a temperature sensor for measuring an internal temperature within the weighing chamber, wherein the vent of the floor portion is automatically opened when the internal temperature measured by the temperature sensor changes equal to or more than a predetermined value.

According to the first aspect of the invention, the electronic balance further comprises a first temperature sensor for measuring an internal temperature within the weighing chamber, and a second temperature sensor for measuring a temperature in the vicinity of the calibration weight placed in the balance body, wherein the vent of the floor portion is automatically opened when a difference between temperatures measured by the first and second temperature sensors is equal to or more than a predetermined value.

According to the first aspect of the invention, the vent of the floor portion is automatically opened or closed at a predetermined regular interval or when a predetermined time elapses after calibration by adding or removing the calibration weight.

According to the first aspect of the invention, a door of the windshield case is opened only when the vent of the floor portion is closed.

According to the first aspect of the invention, the electronic balance further comprises a sealing member for sealing a gap between the vent of the floor portion and the movable floor, being attached to the periphery of the vent of the floor portion.

Since the electronic balance according to this invention is constructed as described above, measurement can be performed with no buoyancy difference between the measuring object and the calibration weight, thereby enhancing measurement accuracy.

DESCRIPTION OF THE PRFERRED EMBODIMENTS

Figure 1A:
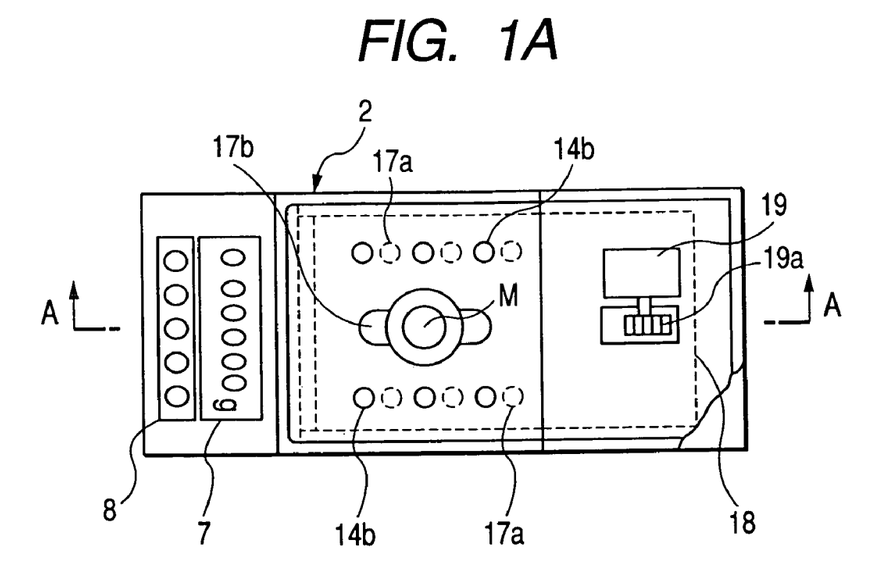
FIG. 1A is a top view of an electronic balance according to a first embodiment of this invention.
Figure 1B:
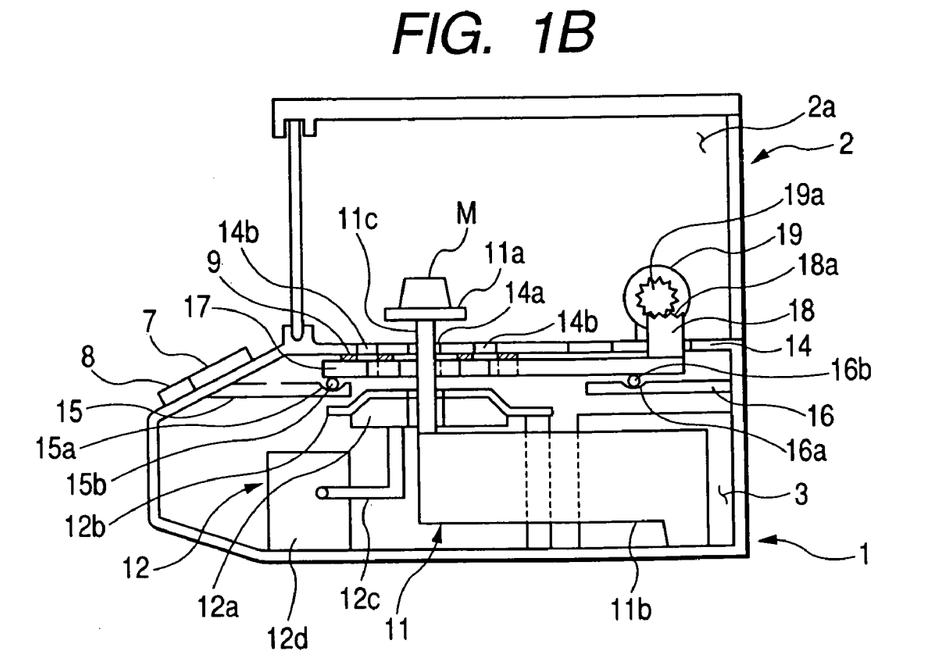
FIG. 1B is a sectional view taken in line A—A in FIG. 1A.

Now referring to the drawings, an explanation will be given of various embodiments of this invention. FIG. 1A is a top view of an electronic balance according to one embodiment of this invention. FIG. 1B is a sectional view taken in line A—A in FIG. 1A.

The electronic balance according to the invention, as shown in FIGS. 1A and 1B, equalize the temperature within a balance body 1 incorporating a mechanism necessary for load measurement and the temperature within a weighing chamber 2a encircled by a windshield case 2 for shielding a measuring object M from an outdoor air. Then the buoyancy which acts on the measuring object M and that which acts on an incorporated weight 12a accommodated in the balance body 1 are equalized. Accordingly, error due to the buoyancy difference is eliminated so as to increase a measuring accuracy.

The balance body 1 internally comprises: a load detecting mechanism 11 including a weighing pan 11a on which a measuring object is placed, a load detecting section 11b for detecting the load of the measuring object M and a coupling shaft 11c in vertical direction for coupling the weighing pan 11a and the load detecting section 11b; a weight adding/removing mechanism 12 including the incorporated weight 12a used for calibration, a weight contact or cap 12b for limiting the upward movement of the incorporated weight 12a, a lever 12c which is vertically-movable and supports the incorporated weight 12a, and a weight driving section 12d capable of vertically driving the lever 12c; and a control section 3 which is described later. On the front slope of the balance body 1, an indicator 7 and an operator 8 are provided. On a floor portion 14 of the weighing chamber 2a, provided are a shaft hole 14a for passing the coupling shaft 11c through and a plurality of vents 14b for permitting an air flow between the interior of the balance body 1 and the weighing chamber 2a. The vents 14b are opened/closed by a movable floor 17 which is arranged so as to move back and forth along the rear side of the floor portion 14. The movable floor 17 is slidably in contact with a roller 15b, which is arranged in a groove 15a of a supporting member 15 fixed to the internal front wall of the balance body 1, and with a roller 16b, which is arranged in a groove 16a of a supporting member 16 fixed to the internal rear wall of the balance body 1.

The movable floor 17 has a plurality of vents 17a of which number and diameter is the same as that of the vents 14b so as to permit an air flow when the vents 17a align with the vents 14b in their center. A long slot 17b which is long in a front-rear direction is provided in the vicinity of the center of the movable floor 17. A gear block 18 with a gear 18a arranged in a planar shape is fixed to the rear of the movable floor 17. On the other hand, a motor 19 with a deceleration gear is fixed onto the floor portion 14. A gear 19a on a rotating shaft of the motor 19 is engaged with the gear 18a of the gear block 18.

Figure 2:
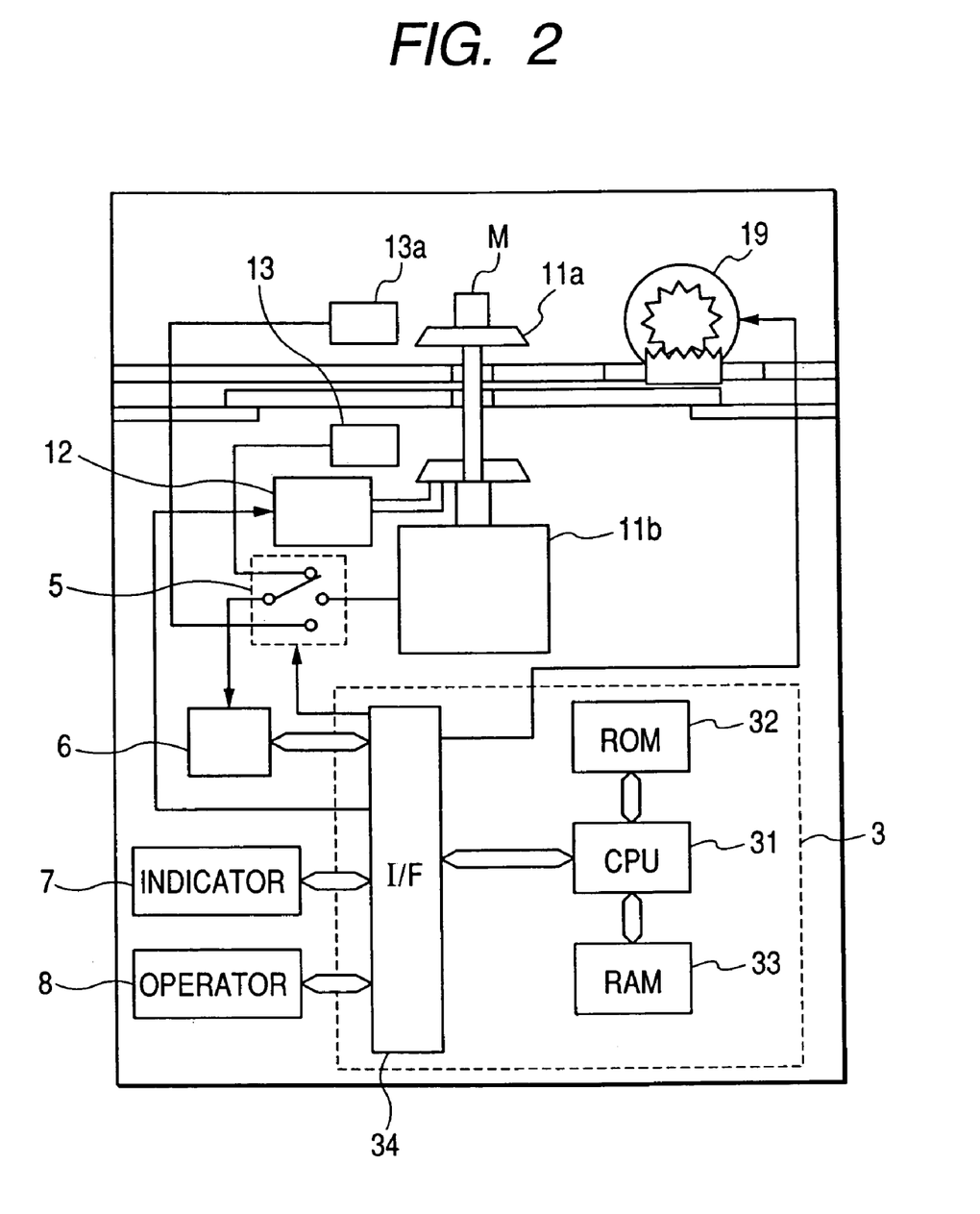
FIG. 2 is a block diagram of an electronic balance according to the first embodiment.

FIG. 2 is a block diagram showing the entire configuration of an electronic balance including a control section 3 according to the embodiment of this invention. The load detecting section 11b outputs an electric signal corresponding to a measuring object M including a weighing pan 11a. The output, after being digitized by an A/D converter 6, is inputted into the control section 3. The control section 3, which is mainly constructed of a microcomputer, includes a CPU 31 for executing operation control processing, a ROM 32 for storing an operation control processing program, a RAM 33 for transferring an operation data and an input/output interface 34 necessary for connection between an external device and the CPU 31. The input/output interface 34 is connected with the indicator 7 for displaying a measured value and the operator 8 for operating the motor 19 as well as the A/D converter 6, the weight adding/removing mechanism 12 and the motor 19.

The incorporated weight 12a is arranged in vicinity of the load detecting section 11b. The weight adding/removing mechanism 12 applies load to or releases load from a load sensing section of the load detecting section 11b by a mechanism such as a cam of the lever 12c and its driving motor. A drive command for the weight adding/removing mechanism 12 is given by the control section 3.

A temperature sensor 13 is arranged in the vicinity of the incorporated weight 12a, and another temperature sensor 13a is provided within the windshield case 2. A switch 5 for switching an input signal is arranged on the input side of the A/D converter 6. The switch 5 serves to sequentially digitize the outputs from the temperature sensors 13, 13a and the output from the load detecting section 11b. The switch 5 is also drive-controlled by the signal from the control section 3.

Next, referring to FIGS. 1A, 1B and 2, explanation will be given of the operation of the embodiment of this invention. Before measurement, a temperature Tu within the windshield case 2 displayed on the indicator 7 and a temperature Td around the weight adding/removing mechanism 12 are checked. If a difference therebetween is not smaller than a predetermined value, an "open" signal is sent out from the operator 8. Then, on the basis of the operation control program, the motor 19 is driven so that the movable floor 17 as well as the gear block 18 moves leftwards and stops at the position where the vents 14b and vents 17a align with each other. When the temperature Tu approaches the temperature Td, a "close" signal is sent out from the operator 8 and the motor 19 is driven in a direction opposite to above. Thus, the vents 14b are closed by the movement of the movable floor 17 so that the air flow between upper and lower parts stops. In this state, there is no difference in buoyancy between the measuring object M and the incorporated weight 12a, thereby permitting accurate measuring with no buoyancy error.

When the measuring object M is placed on the weighing pan 11a, this load is applied to the load detecting section 11b. The load is converted into an electric signal, and then converted into a digital signal by the A/D converter 6. The digital signal is sent out into the CPU 31 through the interface 34. The digital signal is performed on the operation processing on the basis of an operational expression stored in the RAM 33. Thus, the load of the measuring object M is converted into a weight value, and the weight value is displayed on the indicator 7.

Figure 3:
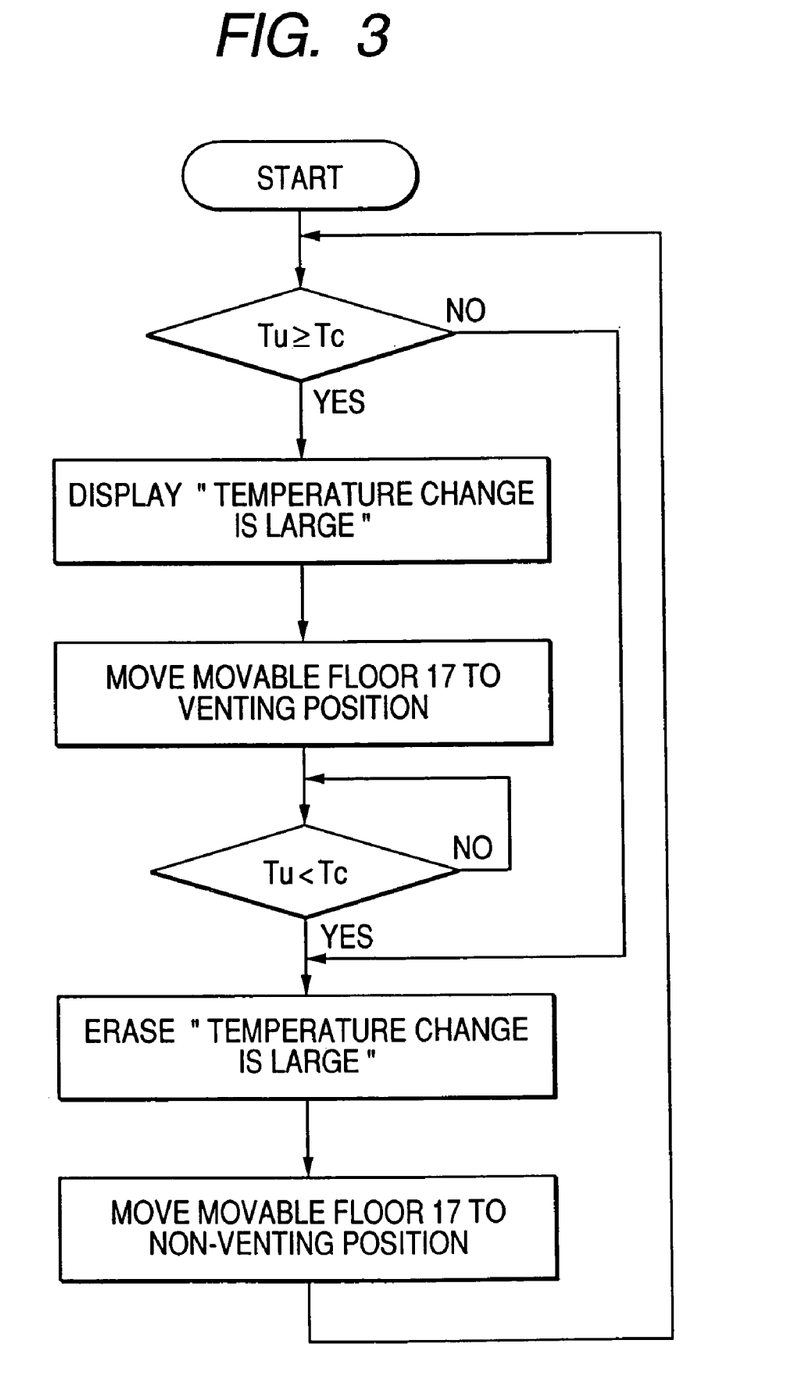
FIG. 3 is a flowchart for explaining the operation of an electronic balance according to a second embodiment of the invention.

FIG. 3 is a flowchart showing the operation of an electronic balance according to a second embodiment of the invention. In the electronic balance, when the temperature Tu measured by the temperature sensor 13*a* within the weighing chamber 2*a* is changed by a temperature equal to or higher than a predetermined temperature Tc, the indication "temperature change is large" is automatically displayed on the indicator 7. Simultaneously, the movable floor 17 is moved to the venting position where the vents 14*b* and the vents 17*a* align with each other. When the temperature Tu approaches the temperature Td within the balance body 1, the indication "temperature change is large" is erased and the movable floor 17 is moved to a non-venting position. Thus, accurate measurement can be performed with no difference in the buoyancy between the measuring object M and the incorporated weight 12*a*.

Figure 4:
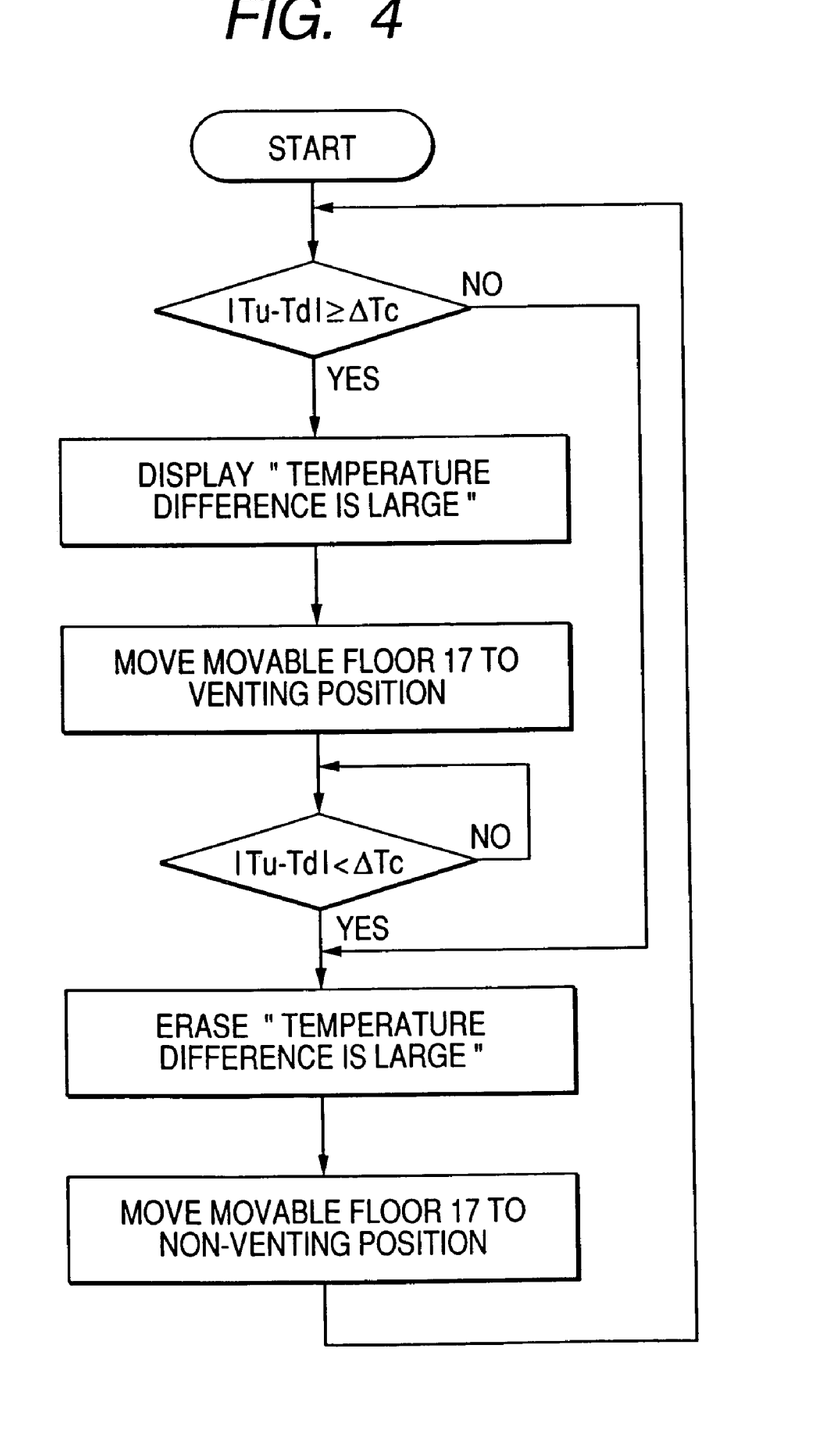
FIG. 4 is a flowchart for explaining the operation of an electronic balance according to a third embodiment of the invention.

FIG. 4 is a flowchart showing the operation of an electronic balance according to a third embodiment of the invention. In this electronic balance, when the temperature difference (Tu−Td) between the temperatures Tu and Td measured by the temperature sensors 13*a* and 13 is equal to or more than a predetermined value ΔTc, the indication "temperature difference is large" is automatically displayed on the indicator 7. Simultaneously, the movable floor 17 is moved to the venting position where the vents 14*b* and the vents 17*a* align with each other. When the temperature difference (Tu−Td) is smaller than ΔTc, the indication "temperature difference is large" is erased and the movable floor 17 is moved to the non-venting position. Thus, accurate measurement can be performed with no difference in the buoyancy between the measuring object M and the incorporated weight 12*a*.

Figure 5:
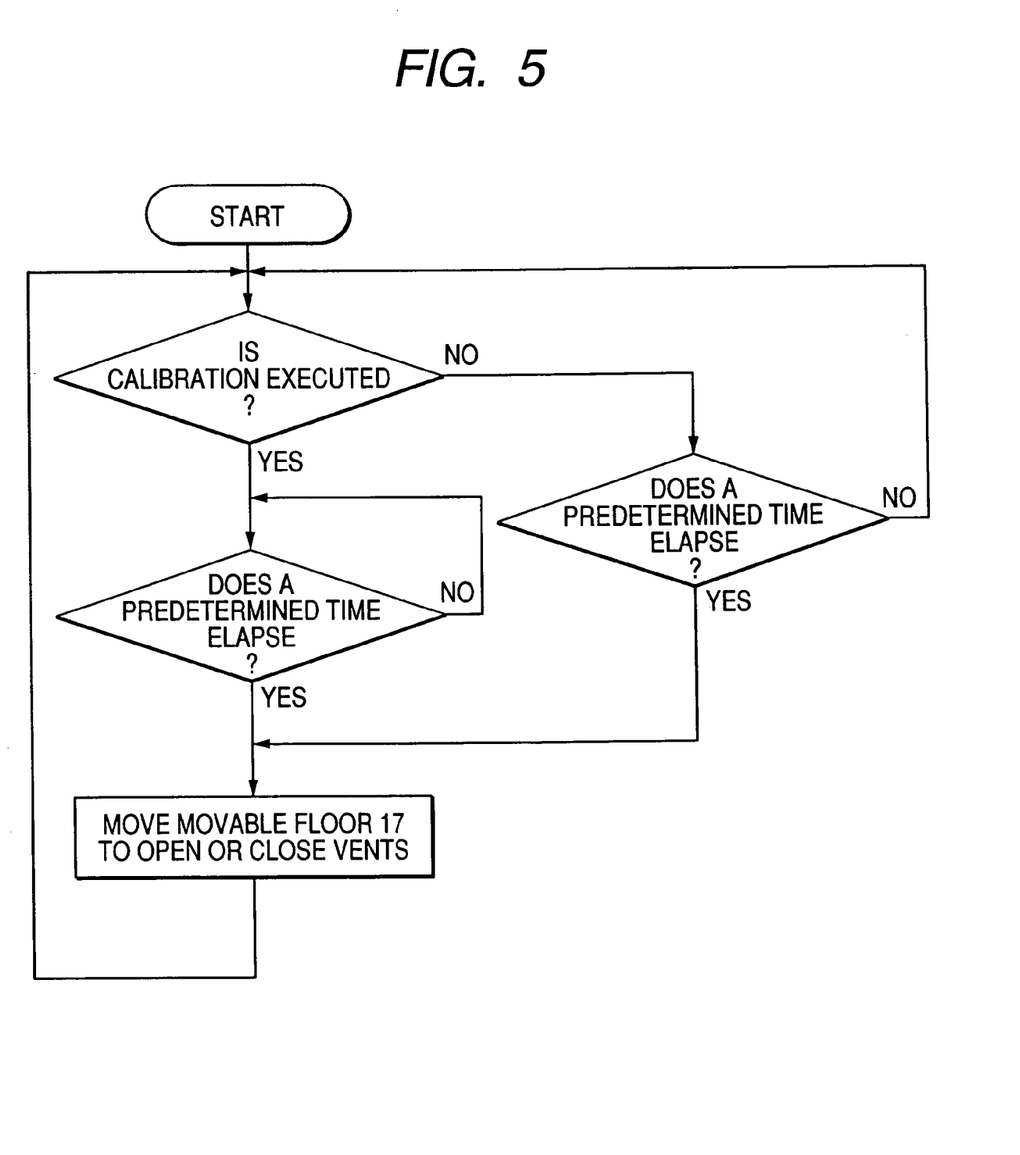
FIG. 5 is a flowchart for explaining the operation of an electronic balance according to a fourth embodiment of the invention.

FIG. 5 is a flowchart showing the operation of an electronic balance according to a fourth embodiment of the invention. In this electronic balance, whenever a predetermined time elapses or a predetermined time elapses after sensitivity calibration is executed, the movable floor 17 is automatically moved to open/close the vents 14*b*.

Figure 6A:
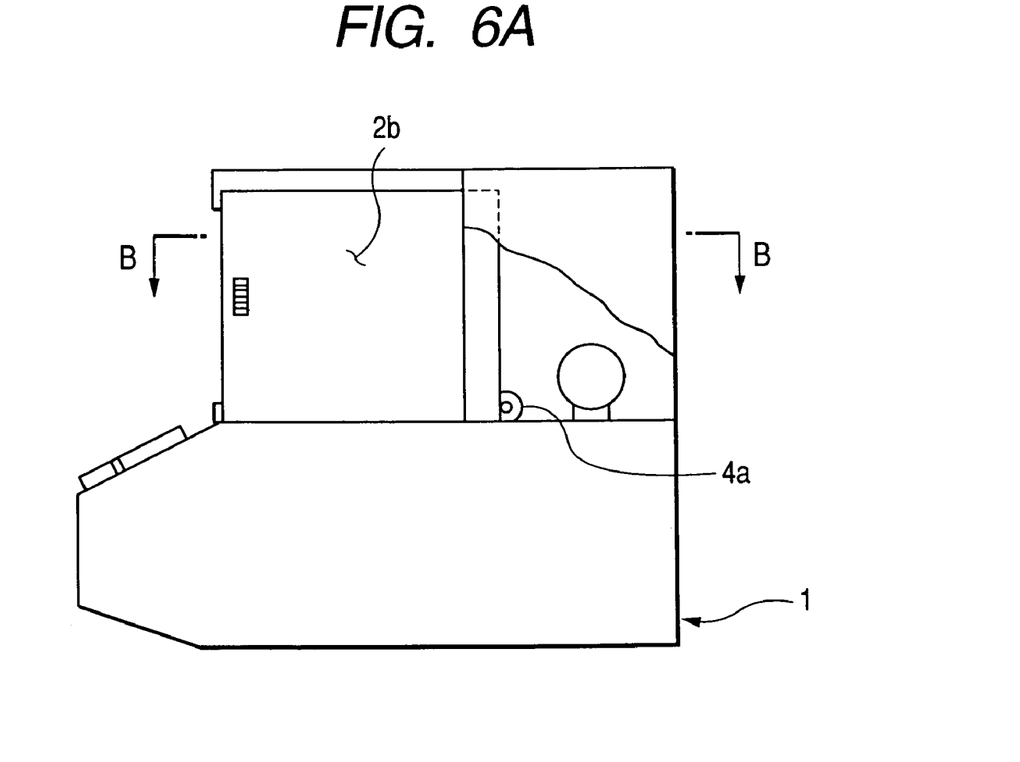
FIG. 6A is a side view of an electronic balance according to a fifth embodiment of the invention and FIG. 6B a sectional view taken in line B—B in FIG. 6A.
Figure 6B:
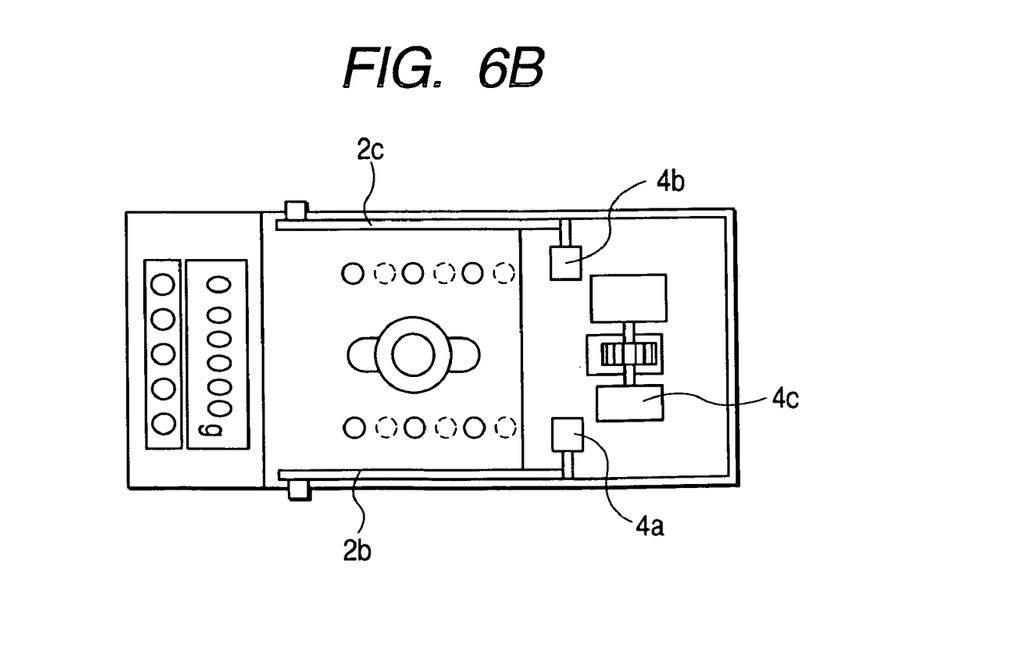
Figure 7:
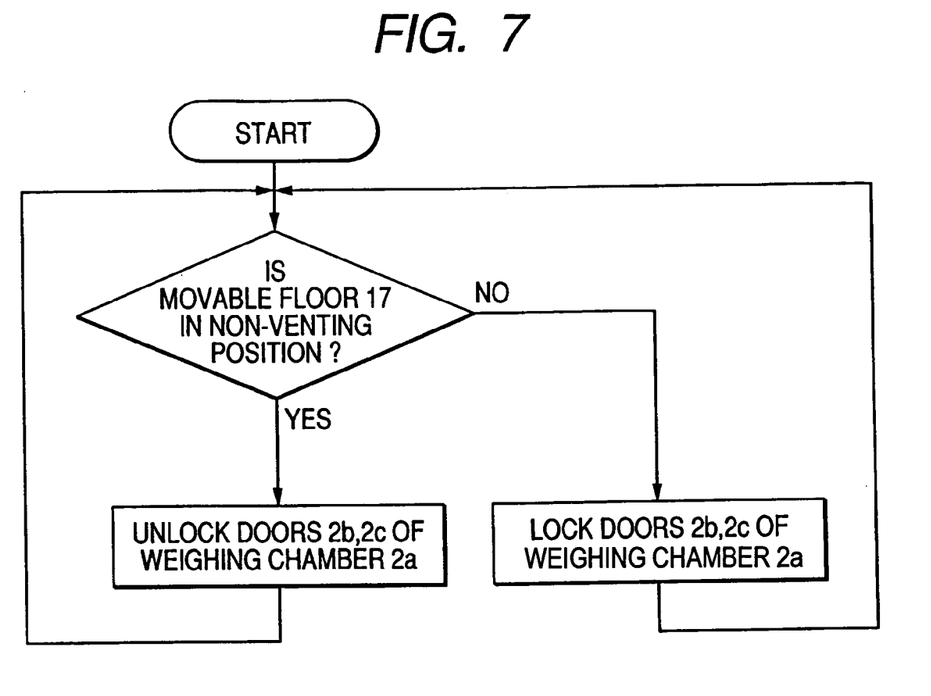
FIG. 7 is a flowchart for explaining the operation of an electronic balance according to a fifth embodiment of this invention.

FIG. 6A is a side view of a lock mechanism of doors 2*b*, 2*c* of the weighing chamber 2*a* according to a fifth embodiment of the invention, and FIG. 6B is a sectional view taken in line B—B in FIG. 6A. FIG. 7 is a flowchart for explaining the operation of the electronic balance according to this embodiment. In the electronic balance, actuators 4*a*, 4*b* such as an electromagnetic solenoid and a position sensor 4*c* such as a potentiometer are fixed onto the floor portion 14 at predetermined positions. In addition, the rotary shaft of the position sensor 4*c* is coupled with the rotary shaft of the motor 19. The position of the movable floor 17 when the vents 14*b* of the floor portion 14 are closed is stored in the RAM 33 of the control section 3 in advance through the position sensor 4*c*. As seen from FIG. 7, the position of the movable floor 17 is monitored by the control section 3 at all times. When the vents 14*b* are closed by the movable floor 17, the actuators 4*a*, 4*b* are turned off by a control signal from the control section 3 so that the locks of the doors 2*b*, 2*c* of the weighing chamber 2*a* is unlocked. When the vents 14 are open, these doors 2*b*, 2*c* are locked. Accordingly, direct contact between the air within the balance body 1 and the ambient air is avoided, thereby preventing a sudden temperature change within the balance body 1.

A sealing member 9 according to a sixth embodiment of the invention is shown in FIG. 1B. The sealing member 9 is ring-shaped and made of e.g. rubber. The sealing member 9 is fixed to the rear side of each of the vents 14*b*. Thus, since the gap formed when the vents 14*b* are closed by the movable floor 17 is completely closed by the sealing member 9, the air flow can be completely stopped, thereby permitting more stable measurement.

The invention should not be limited to the embodiments as described hitherto. For example, a small-sized fan may be provided within the balance body 1. In this case, the small-sized fan is driven with the vents 14*b* being in their opened state so that air circulation is forcibly made. Thus, equalization of the temperatures in the vicinity of the weighing pan 11*a* within the weighing chamber 2*a* and of the incorporated weight 12*a* is promoted.

Furthermore, the movable floor 17 may be arranged so as to move back and forth along the front side of the floor portion 14, and serves the same as the movable floor 17 arranged along the rear side of the floor portion 14 as described above.

In accordance with the electronic balance according to the invention, measurement can be performed by making the temperatures in the vicinity of the weighing pan in the weighing chamber and in the vicinity of the incorporated weight for sensitivity calibration being close to each other. Thus, the measurement can be performed with high accuracy, excluding the error due to a buoyancy difference between the measuring object and the incorporated weight.

This invention can be applied to an electronic balance having high-accuracy equipped with a windshield case.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An electronic balance provided with a balance body incorporating a load measuring mechanism and a calibration weight, and a weighing chamber encircled by a windshield case arranged above the balance body, said electronic balance comprising:

a floor portion separating said balance body and said weighing chamber, and provided with at least one vent;

a movable floor arranged parallel in the vicinity of said floor portion, and provided with at least one vent corresponding to the vent of said floor portion; and a moving mechanism for moving said movable floor in parallel to said floor portion.

2. The electronic balance according to claim 1, said electronic balance further comprising:

a temperature sensor for measuring an internal temperature within said weighing chamber, wherein said vent of the floor portion is automatically opened when the internal temperature measured by said temperature sensor changes equal to or more than a predetermined value.

3. The electronic balance according to claim 1, said electronic balance further comprising:

a first temperature sensor for measuring an internal temperature within said weighing chamber; and a second temperature sensor for measuring a temperature in the vicinity of the calibration weight placed in the balance body, wherein said vent of the floor portion is automatically opened when a difference between temperatures measured by the first and second temperature sensors is equal to or more than a predetermined value.

4. The electronic balance according to claim 1, wherein said vent of the floor portion is automatically opened or closed at a predetermined regular interval or when a predetermined time elapses after calibration by adding or removing the calibration weight.

5. The electronic balance according to claim 1, wherein a door of said windshield case is opened only when the vent of the floor portion is closed.

6. The electronic balance according to claim 1, further comprising:

a sealing member for sealing a gap between said vent of the floor portion and said movable floor, attached to the periphery of said vent of the floor portion.

7. The electronic balance according to claim 2, wherein said vent of the floor portion is automatically closed when the internal temperature measured by said temperature sensor changes less than said predetermined value.

8. The electronic balance according to claim 3, wherein said vent of the floor portion is automatically closed when the difference between temperatures measured by the first and second temperature sensors is less than a predetermined value.

* * * * *